United States Patent [19]
Bissell

[11] Patent Number: 5,152,497
[45] Date of Patent: Oct. 6, 1992

[54] SQUEEZE-OFF CLAMP

[75] Inventor: Alan B. Bissell, Columbia Falls, Mont.

[73] Assignee: Timberline Northwest, Inc., Columbia Falls, Mont.

[21] Appl. No.: 699,142

[22] Filed: May 13, 1991

[51] Int. Cl.⁵ .................................................. F16K 7/04
[52] U.S. Cl. ...................................... 251/9; 81/422
[58] Field of Search ................. 251/9; 81/422, 424, 81/318, 319, 324, 329, 416, 441

[56] References Cited

U.S. PATENT DOCUMENTS

| | | |
|---|---|---|
| 120,144 | 10/1871 | Zieler . |
| 597,740 | 1/1898 | Pusey . |
| 677,414 | 7/1901 | Howland . |
| 682,701 | 9/1901 | Howland . |
| 798,827 | 9/1905 | Pirsch . |
| 1,086,078 | 2/1914 | Palmer . |
| 1,373,683 | 4/1921 | Svebilius . |
| 2,618,184 | 11/1952 | Goedhart .......................... 81/422 X |
| 2,825,525 | 3/1958 | Kellam . |
| 3,460,797 | 8/1969 | Allenbaugh, Jr. . |
| 3,903,725 | 9/1975 | Rommel .......................... 81/422 X |
| 4,077,601 | 3/1978 | Dick .................................. 251/9 |
| 4,191,359 | 3/1980 | Andersson et al. ................ 251/9 |
| 4,537,099 | 8/1985 | Oster et al. ...................... 81/422 X |
| 4,582,292 | 4/1986 | Glotzback et al. . |
| 5,052,251 | 10/1991 | Mills .................................. 81/324 |

Primary Examiner—John C. Fox
Attorney, Agent, or Firm—Dorsey & Whitney

[57] ABSTRACT

An adjustable squeeze-off clamp for controlling the flow of a material flowing in a relatively soft-walled conduit is provided. The clamp broadly includes a static jaw, a moveable jaw with an associated adjustment member, and an over-the-center operating linkage, including an operating lever, operably connecting the jaws. The gripping surfaces of the jaws are rounded to prevent damaging the workpiece. The adjustment member is for adjusting the compressive force exerted by the jaws on a conduit prior to gripping the conduit or even prior to moving the handles. The adjustment member is operably connected to the moveable jaw, is rotated to selectively vary the space remaining between the jaws when they are fully closed, and includes a detent lock for securing it in a selected position.

19 Claims, 4 Drawing Sheets

SQUEEZE-OFF CLAMP

TECHNICAL FIELD

The present invention relates to clamping devices. In particular, it relates to an improved pliers-type clamp for clamping or compressing relatively soft-walled conduits to control the flow of material flowing therein.

BACKGROUND OF THE INVENTION

Clamp devices, including pliers-type tools or wrenches, have been in use for a long time. Such tools typically have a pair of opposed jaws defining a workpiece receiving space. At least one of the jaws is movable with respect to the other, and a handle usually is associated with each jaw. The jaws may be connected pivotally so that when the handles are moved inwardly or outwardly with respect to each other, the jaws will be caused to move similarly. U.S. Pat. No. 597,740 discloses such a pliers and that it is known to provide a pliers with jaws that remain parallel as the pliers is operated. U.S. Pat. No. 682,701 discloses another pliers with a central pivot and parallel locking jaws.

U.S. Pat. No. 120,144 discloses an improved pincher or pliers that includes a lever having a cam-like projection at one edge. The projection is shaped so that when the lever and an opposing arm, which together form the handles of the pincher, press together, it raises the rear end and depresses the front end of one of the jaws, closing the jaws together.

None of the above-noted patents discloses an adjustment feature associated with the jaws, other than simple handle movement, to vary the compressive force exerted by the jaws on a gripped object. There are commercially available pliers wherein the space between the jaws may be varied, but the adjustment involves shifting an entire jaw/handle unit about a central pivot or operating a screw device connected to one of the handles. It would be advantageous to be able to vary the compressive force exerted by the jaws conveniently and rapidly prior to manipulating the handles and without resorting to additional lever or screw features associated with the handles.

U.S. Pat. Nos. 2,825,525, 4,077,601 and 798,827 disclose that pliers-type tools have been adapted for use as hose clamps or compressors. For example, U.S. Pat. No. 798,827 discloses a jaw member pivoted to a main lever, brackets on either side of the jaw, and a cam lever arrangement. The closing of the jaw member is accomplished by swinging the cam lever downwardly, causing a cam loop to press against a bearing plate, forcing the jaw member to swing toward the main lever. The jaw member and main lever are rounded to prevent cutting the hose to be clamped. The hose clamp disclosed in U.S. Pat. No. 4,582,292 is somewhat similar and is directed to reducing the chance that the hose will pop out from between the jaws when the jaws are opened.

U.S. Pat. No. 3,460,797 discloses a hose compressor including a clamping arm hingedly connected to one end of a base. Two toggle arms extend upwardly on opposite sides of the clamping arm and are connected to a handle. Forward movement of the handle moves the toggle arms forward to open the clamping jaws. The jaws include opposing jaw faces with recesses for receiving narrow, elongated jaw inserts with curved surfaces. The inserts are formed from elastomeric material.

While the above-cited patents and commercially available pliers show improvements and advances in clamping tools, and in adapting such tools for compressing a conduit to control the flow of material in the conduit, there are some inadequately addressed problems. First, while any jaw-type clamp defines a workpiece receiving space between its jaws, the only way to vary that space, and the compressive pressure exerted by the jaws on a workpiece, is to manipulate the handles or screw or lever structures associated directly with the handles. It would be advantageous if the space remaining between the jaws, when the jaws are closed fully, could be selected easily, rapidly and precisely prior to placing the tool on a conduit and prior to applying compressive force to the conduit. When clamping relatively soft-walled conduits, particularly those conveying potentially hazardous or flammable material, it is crucial that the jaws be adjusted appropriately prior to exerting a compressive force, thereby minimizing the chance of damaging the conduit, yet ensuring that the lumen of the conduit is completely closed.

Another problem is that a clamp tool may need to be left in place on a conduit for an indeterminate length of time. Thus, it would be advantageous to be able to set a tool on a conduit and release the handles, yet have the tool remain in place as long as necessary without resorting to complicated locking mechanisms. To prevent tampering or when the clamp must remain in place for an extended time, it would be an advantage if the clamp had a simple auxiliary lock receiving feature for receiving a pin, bolt or padlock, thereby rendering the handles unmovable.

Still another problem is that prior art clamps generally are designed to grip an object from the side, not from directly above the object. It would be helpful if a clamp could be applied from above a conduit with confidence that it would entirely compress the conduit and remain in place. This would be particularly helpful when the conduit is in a confined area such as a narrow trench.

Additional concerns include providing a clamp that may be grasped and operated securely by a user in adverse conditions such as freezing or wet weather. The weight of the clamp should be light so that it may be carried easily to worksites or to remote locations. It should be durable and fabricated of a spark resistant material.

Clearly, there is a need for an efficient, durable conduit clamp that completely controls the flow in a conduit, minimizes problems with handling, maximizes safety, and may be adjusted accurately, easily and quickly for use on conduits of different sizes.

SUMMARY OF THE INVENTION

An adjustable squeeze-off clamp for controlling the flow of a material flowing in a relatively soft-walled conduit is provided. The clamp broadly includes a static jaw, a moveable jaw with an associated adjustment member, and an operating linkage, including an operating lever, operably connecting the jaws. The gripping surfaces of the jaws are rounded to prevent damaging the workpiece. The adjustment member is for adjusting the compressive force exerted by the jaws on a conduit prior to gripping the conduit or even prior to moving the handles. The adjustment member is operably connected to the moveable jaw, is rotated to selectively vary the space remaining between the jaws when they are fully closed, and includes a detent lock for securing it in a selected position.

In the preferred embodiment, the clamp of the present invention may be formed substantially of high-tensile cast aluminum.

It is an object of the present invention to provide a hand-operated, pliers-type squeeze-off clamp for controlling the flow of a fluid flowing in a relatively soft-walled conduit such as a polyethylene pipe.

It is another object of the present invention to provide a light, pliers-type squeeze-off clamp having jaws for compressively flattening a conduit to stop the flow of a fluid flowing in the conduit, wherein the size of the gripping space between the jaws may be adjusted appropriately to match the diameter and wall thickness of the conduit, and wherein the clamp includes an over-the-center, self-locking operating linkage for closing the jaws and for keeping the jaws closed.

One of the advantages of the present invention is that it enables the compressive force enabled by the clamp to be selected prior to applying any compressive force to a conduit. Adjustment is convenient and rapid without requiring additional tools and, because the adjustment member is releasably lockable, the user may be confident that the selected size will not change after the clamp is installed.

The clamp of the present invention may be used safely with at least four sizes of relatively soft-walled polyethylene conduit for conveying potentially flammable or hazardous material such as natural gas. Other advantages include that it is lightweight, eliminates side torque problems common to screw-type clamps, and is made of corrosion resistant, non-sparking aluminum. The clamp has ribbed or textured handles for enabling a secure, firm grip in adverse weather conditions, in mud, or even when the clamp is used under water.

DETAILED DESCRIPTION OF THE PREFERRED EMBODIMENT

Figure 1:
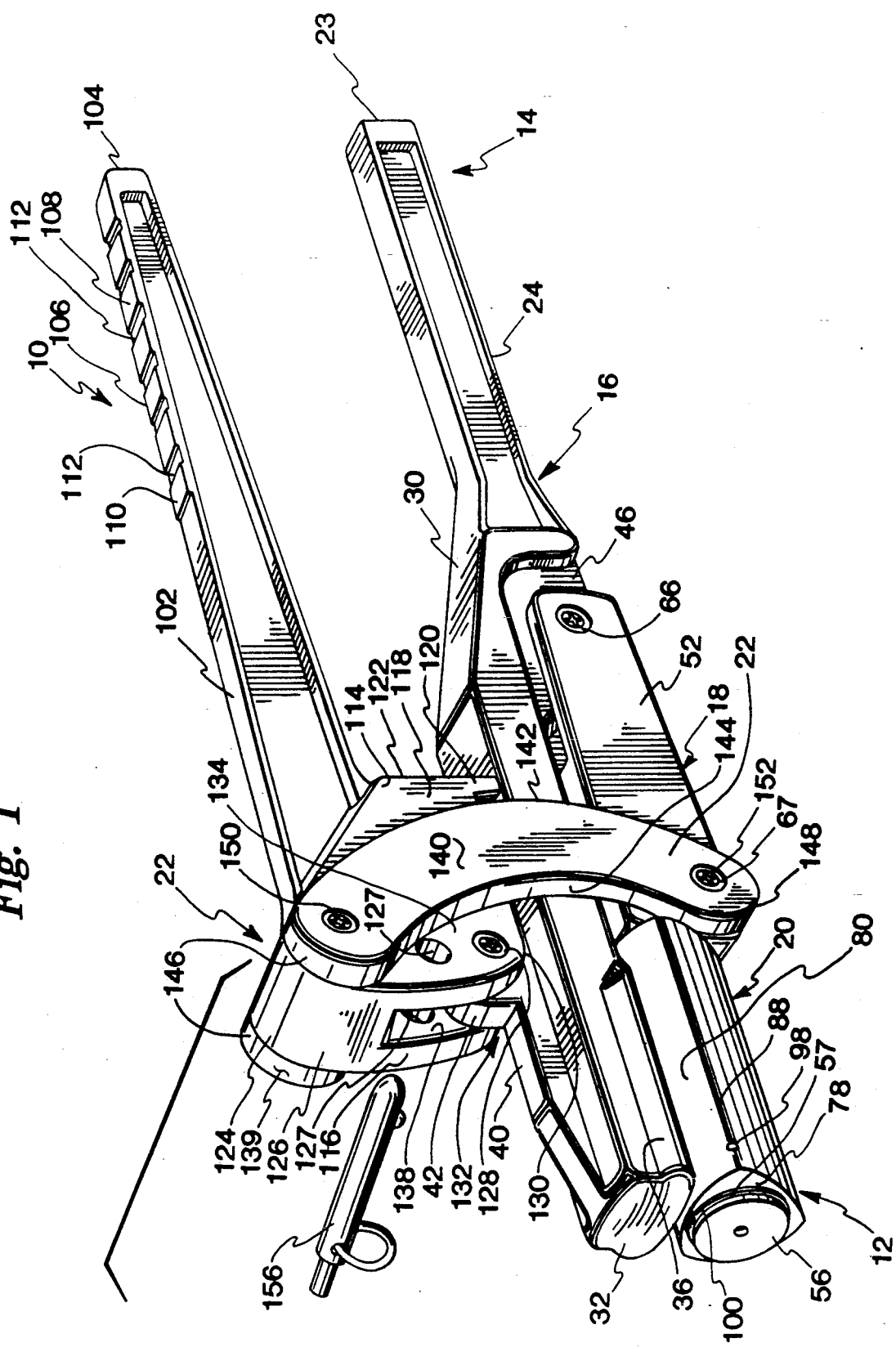
FIG. 1 is a perspective view of the clamp of the present invention.

Referring to the drawings, the articulated, adjustable squeeze-off clamp 10 of the present invention has a conduit or workpiece gripping end 12 and a handle end 14. The clamp 10 includes a static jaw 16, a moveable jaw 18 with an associated adjustment member 20, and an operating linkage 22 operably coupling the jaws 16, 18. The linkage 22 is located generally midway between the gripping and handle ends 12, 14, respectively.

Figure 2:
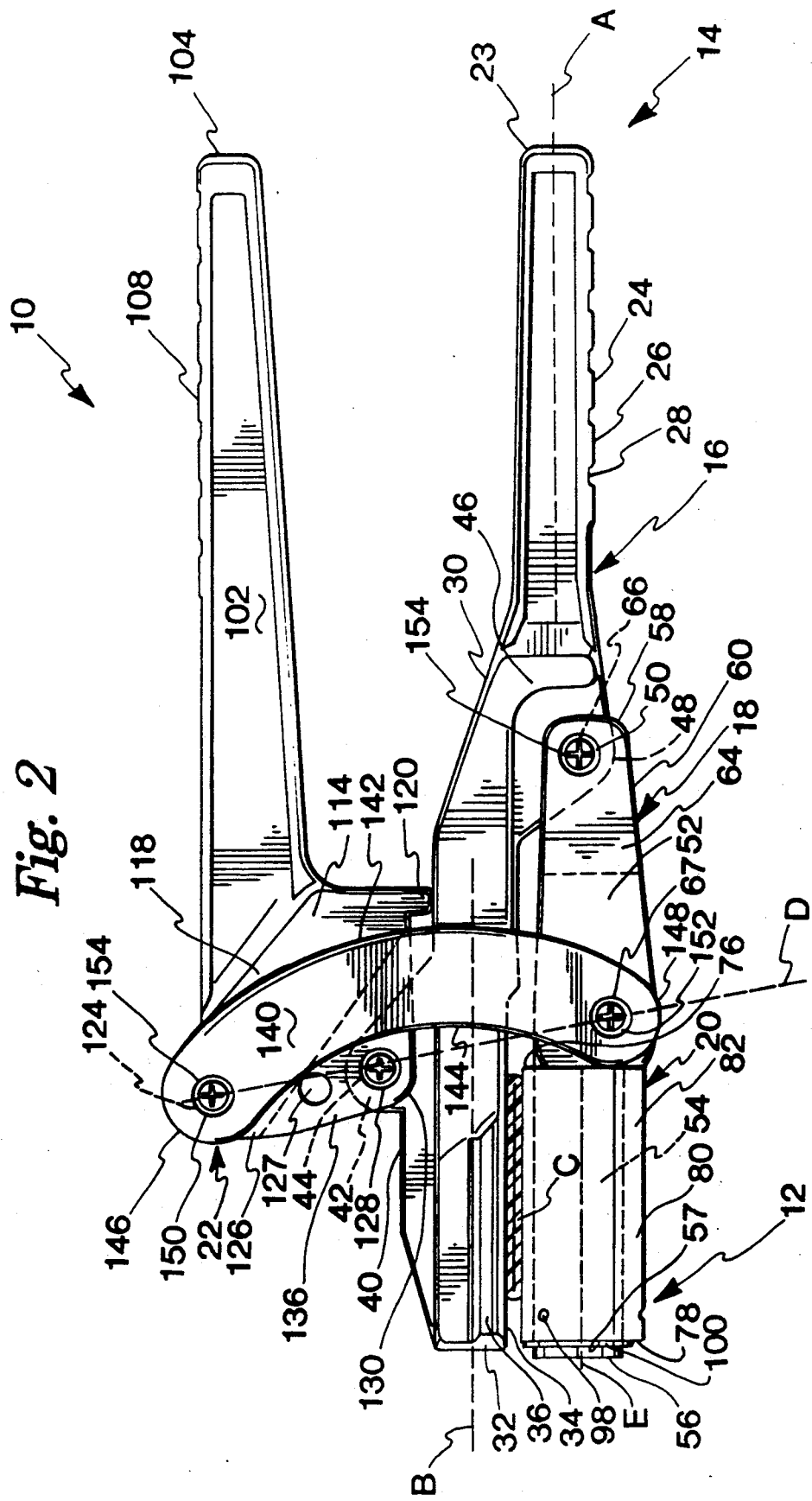
FIG. 2 is a left side elevational view of the clamp depicting the jaws closed on a workpiece.

Referring to FIG. 2, the static jaw 16 is a rigid, generally straight, elongated, unitary member having a butt end 23. A hand grip area 24, having a central axis A, is adjacent to and extends away from the butt end 23. The outwardly facing surface of the hand grip area 24 has a texture comprising a plurality of alternating transverse elevated ribs 26 and depressed grooves 28 (see FIG. 5). A slightly angled neck 30 is adjacent the end of the hand grip area 24, generally at the middle of the length of the static jaw 16. From the neck 30, the jaw 16 extends along a second, generally central axis B to a nose 32 at the workpiece gripping end 12. The second axis B is slightly offset from and generally parallel to the axis A of the hand grip area 24.

Figure 4:
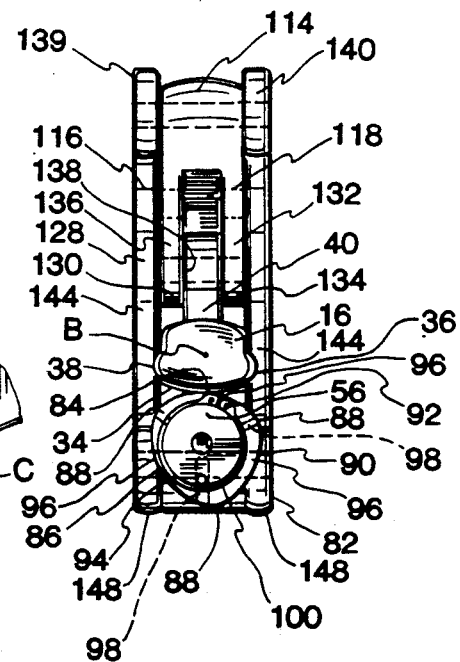
FIG. 4 is a front elevational view of the clamp of the present invention.

A workpiece contacting gripping surface 34 is adjacent the nose 32, between the nose 32 and the neck 30. Referring to FIG. 4, the gripping surface 34 is extended bilaterally with respect to the static jaw 16, and axis B, by rounded side flanges 36, 38. At the opposite side of the jaw 16, 180 degrees from the gripping surface 34, a spine 40 extends along the jaw 16 from adjacent the nose 32 in the direction of the neck 30. The spine 40 terminates at an operating linkage eye 42 generally adjacent to the neck 30. The eye 42 stands outwardly away from the spine 40, tapering toward the neck 30, into the jaw 16. An aperture 44 is in the eye 42 adjacent the outermost portion thereof.

Referring to FIGS. 1 and 2, a movable jaw eye or web 46 having a generally arcuate free edge 48 stands outwardly from the static jaw 16 adjacent the neck 30. The eye 46 extends from the side of the jaw 16 having the gripping surface 34 and is generally coplanar with the spine 40. A movable jaw pivot aperture 50 is adjacent the outermost free edge 48 of the eye 46.

Figure 3:
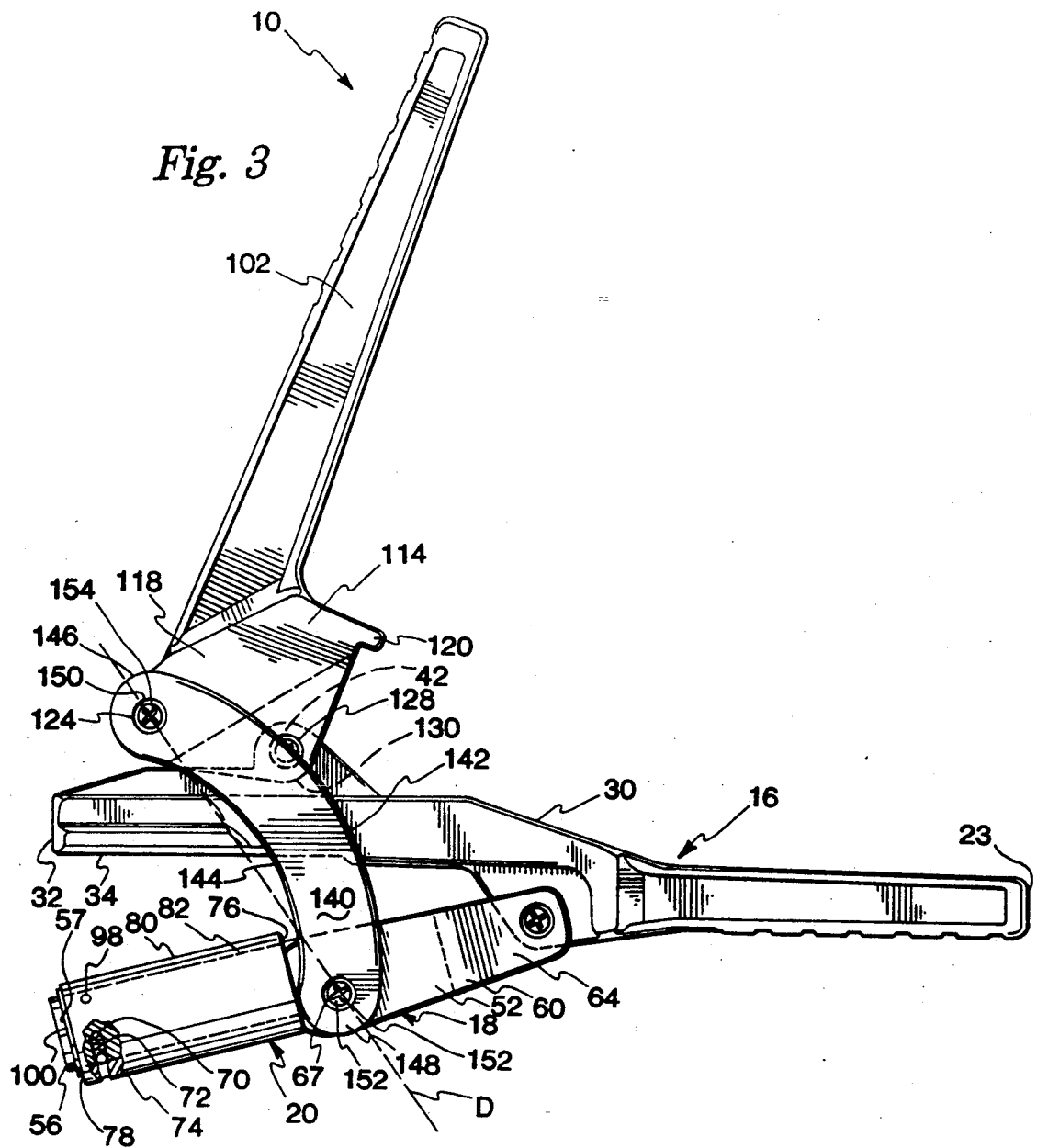
FIG. 3 is a left side elevational view of the present invention, depicting the jaws open, with portions cut away to show additional detail.
Figure 5:
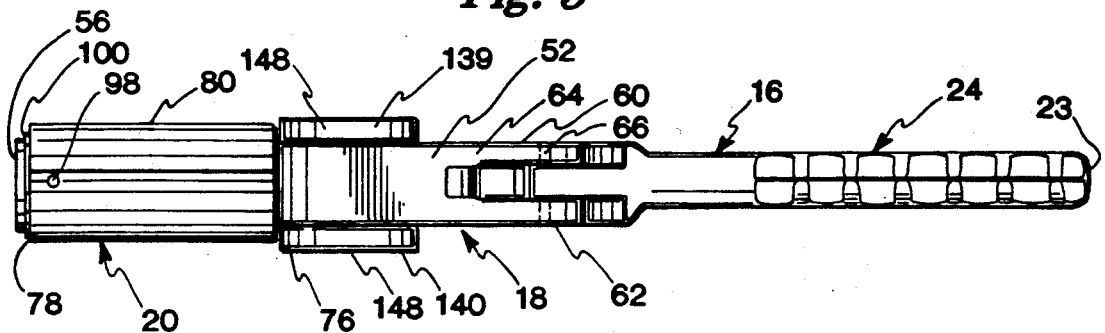
FIG. 5 is a bottom plan view of the clamp of the present invention.

Referring to FIGS. 2 and 5, the movable jaw 18 is a lever-like member, relatively shorter than the static jaw 16, having a generally rectangular shank portion 52 and a generally cylindrical portion 54 with a central axis E. The jaw 18, and particularly the cylindrical portion 54, terminates at a free end 56. An annular channel 57 is adjacent to the free end 56. A movable jaw connecting clevis 58 is at the second, opposite end of the movable jaw 18. The clevis 58 comprises a pair of parallel shoulders 60, 62, integral with the rectangular portion 52 of the jaw 18. The shoulders 60, 62 are separated and formed by a relieved area 64. An aperture 66, where the movable jaw 18 is pivotally connected to the static jaw 16, is adjacent the end of the shoulders 60, 62. Another aperture 67 is adjacent the opposite end of the rectangular portion 52, between aperture 66 and the cylindrical portion 54. Referring to FIG. 3, a generally radial detent drilling 70 is located near the free end 56, adjacent to the annular channel 57. A detent spring 72 and ball 74 are received in the drilling 70.

Referring to FIGS. 1 and 2, the barrel-like adjustment member 20 is operably, rotatably coupled to the cylindrical portion 54 of the movable jaw 18. Specifically, the adjustment member 20 is a generally cylindrical, hollow body with two opposite, open ends 76, 78. The member 20 has a generally central axis that is coaxial with the axis E of the cylindrical portion 54 when the member 20 is coupled to the jaw 18 as depicted in the Figures. The inner diameter of the central bore 82 of the adjustment member 20 closely corresponds to the outer diameter of the cylindrical portion 54 of the movable jaw 18. One end 76 of the adjustment member 20 abuts the shank portion 52 of the jaw 18, and the opposite, second end 78 is closely adjacent to the channel 57.

The outer diameter or effective gripping, conduit contacting surface 80 of the adjustment member 20 is eccentric with respect to the axis of the member 20 and with respect to the axis E of the jaw 18 when the member 20 is coupled to the jaw 18.

Referring to FIG. 4, the member 20 is machined or formed to present at least three discreet workpiece gripping surfaces 82, 84, 86 with a generally outermost, rounded transition edge 88 between each. The body of the member 20 has varying thicknesses including a thick wall portion 90, a middle wall portion 92, and a thin wall portion 94, corresponding to each of the workpiece contacting surfaces 82, 84, 86, respectively. Further reference to FIG. 4 shows that, when the adjustment member 20 is in place on the movable jaw 18, the radial distance from the jaw axis E to the generally central area 96 of each of the surfaces 82, 84, 86 is different. The surfaces 82, 84, 86 have an arc substantially similar to, but slightly flatter than the outer diameter of the cylindrical portion 54.

The adjustment member 20 has at least three detent holes 98. The holes 98 are adjacent the transition edges 88, and each hole 92 is associated with one of the surfaces 82, 84, 86. A typical, commercially available snap ring 100 is received in the channel 57 and is directly adjacent the end 78 of the adjustment member 20.

Referring to FIG. 1, the operating linkage 22 operably couples the static and movable jaws 16, 18, respectively. The linkage 22 includes an elongated, rigid, unitary operating lever 102 having a rear or butt end 104. A operating lever hand grip area 106 extends along the length of the lever 102 from adjacent the butt end 104. The outwardly facing surface 108 of the hand grip area 106 is textured by a plurality of parallel, transverse alternating ribs 110 and grooves 112.

Referring to FIGS. 1, 2 and 4, a generally polygonal, solid expanded portion 114 with planar, parallel sides 116, 118 is at the second or forward end of the lever 102. An integral foot or stop 120 extends from the expanded portion 114, generally from the same, rearward edge 122 of the portion 114 to which the lever 102 is joined. A pivot aperture 124 is located adjacent the forward edge 126 of the expanded portion 114, generally diametrically across the extent of the expanded portion 114 from the foot 120. A security hole 127 is adjacent the edge 126, generally in-line with the pivot aperture 124. An over-the-center pivot aperture 128 is also near the edge 126, generally diametrically across from the junction between the lever 102 and the expanded portion 114, near the rounded corner 130 of the expanded portion 114.

An operating linkage clevis 132 is also at the corner 130. The clevis 132 comprises a pair of parallel shoulders 134, 136 integral with the expanded portion 114. A relieved area 138 is between the shoulders 134, 136. The over-the-center pivot aperture 128 extends through both shoulders 134, 136. The expanded portion 114 (and therefore, the operating lever 102 as well) is operably, pivotally connected to the static jaw 16 at the aperture 44 in the operating linkage eye 42.

With further reference to FIGS. 1 and 2, the operating linkage 22 includes two curved, elongated side links 139, 140, each having a convex edge 142 and a concave edge 144. The links are generally flat, unitary and relatively thin. Each link 139, 140 has opposed, rounded upper and lower ends 146, 148, respectively. Each has an upper pivot aperture 150 and a lower pivot aperture 152. The links 139, 140 are pivotally, operably coupled to the expanded portion 114 at the pivot aperture 124 and to the movable jaw 18 at the aperture 67. The pivotal connections coupling the jaws 16, 18, the components of the operating linkage 22, and coupling the operating linkage 22 to the jaws 16, 18 may be made by stainless steel pivot pins 154 received in the pivot apertures identified above.

Figure 6:
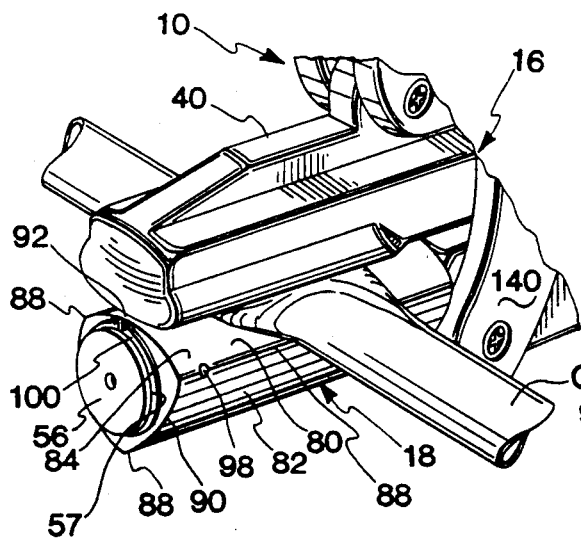
FIG. 6 is a fragmentary perspective view depicting a conduit compressed between the jaws of the clamp.

Referring to FIGS. 2 and 6, the clamp 10 may be used to compress the wall of a relatively soft-walled conduit or pipe C. Such conduits may be made of polyethylene and may be used for conveying natural gas. For this purpose, typical sizes of conduits are one-half inch CTS, three-quarter inch CTS, one inch CTS, one and one-fourth inch CTS, one-half inch IPS, three-quarter inch IPS, one inch IPS or metric equivalents thereof. The clamp 10 of the present invention may be used on any of the aforementioned sizes.

In use, before applying a compressive force on the conduit, the adjustment member 20 is rotated about the jaw 18 until a selected surface 82, 84, 86 is generally opposed to the gripping surface 34 of the static jaw 16. Because the thickness of the member 20 varies, when the jaws 16, 18 are fully closed the space remaining between the jaws 16, 18 will vary according to the selected position of the member 20. The position of the member 20, and the resulting space between the jaws 16, 18, is selected to match or be slightly smaller than the doubled thickness of the compressed conduit wall, thus closing the lumen of the conduit C, as depicted in FIG. 2. The member 20 will be releasably locked in the selected orientation by the engagement of the detent ball 74 and the detent hole 98.

An advantage of the present invention may be seen by referring to FIG. 2. Specifically, the chance of damaging a conduit is minimized because the arc or curve of the concave edge 144 of the side links 139, 140 enables the links 139, 140 to clear a conduit even as the conduit is being compressed, and consequently spread, between the jaws 16, 18.

Another advantage of the clamp 10 may be perceived by comparing FIGS. 2 and 3. When the clamp 10 is open (FIG. 3), a line D drawn through the centers of the pivot aperture 124 and the aperture 67 is forward of the pivotal connection between the expanded portion 114 and the static jaw 16 at the over-the-center pivot aperture 128. When the clamp 10 is closed fully on a conduit C (FIG. 2), the line D is on the other side or rearwardly of the pivot aperture 128, thereby locking the jaws 16, 18 in place. A security device, such as a pin 156 (depicted in FIG. 1), may be placed in the security hole 127 to prevent tampering.

A number of variations of the present invention can be made. For example, although the adjustment member 20 has three workpiece contacting surfaces 82, 84, 86, more or fewer such surfaces may be provided. The preferred material and method for forming the clamp 10 is casting high-tensile A356 aluminum, but other appropriate materials and methods may be used.

The present invention may be embodied in other specific forms without departing from the spirit or essential attributes thereof. It is therefore desired that the present embodiment be considered in all respects as illustrative and not restrictive, reference being made to the appended claims rather than to the foregoing description to indicate the scope of the invention.

What is claimed is:

1. An adjustable clamp for exerting a compressive force on a workpiece comprising:
    a first elongated jaw having a handle end and a second, opposite end;
    a second jaw movably coupled directly to said first jaw at a joint between ends of said first jaw;

an operating means for opening and closing said jaws, said operating means movably coupled directly to said first jaw between said second end and said joint;

link means operably coupled to said second jaw and said operating means for communicating to said second jaw the movement of said operating means; and adjustment means operably coupled to said second jaw for selectively changing said compressive force exerted on said workpiece when said clamp is fully closed.

2. The clamp according to claim 1, wherein said adjustment means comprises a generally cylindrical adjustment member having an accentric outer surface, said member being rotatably, operably coupled to said second jaw.

3. The clamp according to claim 2, wherein said second jaw has a jaw axis and further wherein said adjustment member has a generally central axis of rotation, said axis of rotation being generally coaxial with said jaw axis.

4. The clamp according to claim 2, wherein the outer surface of said adjustment means is the workpiece contacting surface of said second jaw.

5. The clamp according to claim 1, wherein said adjustment means has a generally central axis of rotation, an outer surface, and at least two radii having different lengths, said radii extending between said central axis of rotation and said outer surface.

6. The clamp according to claim 1, wherein said operating means comprises an operating lever having a handle end and a second end, said second end of said operating lever pivotally connected to said first jaw.

7. The clamp according to claim 1, wherein said link means comprises two curved links, one on each side of said jaws, said links being generally parallel with respect to each other and being pivotally coupled to said second jaw and said operating means.

8. An adjustable clamp for compressing fluid-conveying conduits to control the flow of fluid therein, said clamp having a working end and a handle end and comprising:

compressing means at said working end for compressing conduits, said compressing means comprising a static jaw and a generally opposed moveable jaw, each having a jaw axis, said moveable jaw pivotally coupled directly to said static jaw at a joint, said jaws defining a conduit receiving space therebetween;

operating means for operating said compressing means, said operating means comprising an end of said static jaw remote from said conduit receiving space and an operating lever pivotally coupled directly to said static jaw adjacent one end of said lever, said operating means including link means for operably coupling said operating lever and said second jaw; and adjustment means rotatably, operably coupled to said second jaw; for selectively varying the size of said conduit receiving space, said adjustment being adjacent said working end of said clamp.

9. The clamp according to claim 8, wherein said adjustment means comprises a generally cylindrical adjustment member having a generally central axis of rotation and an irregular outer surface, said jaw axis and said axis of rotation being generally coaxial.

10. The clamp according to claim 9, wherein said outer surface of said generally cylindrical member includes at least three discreet smoothly arcuate areas each defined by a different radius extending from said member axis of rotation to said outer surface.

11. The clamp according to claim 10, wherein said adjustment means includes detent means for releasably holding said adjustment means in a selected position.

12. The clamp according to claim 8, wherein said link means comprises a pair of curved links with generally opposed first and second link ends, one link on each side of said jaws, each link pivotally coupled to said second jaw at said first link end, and pivotally coupled to said operating lever at said second link end.

13. An adjustable clamp for compressing fluid-conveying conduits to control the flow of fluid therein, said clamp having a working end and a handle end and comprising:

compressing means at said working end for compressing conduits, said compressing means comprising a static jaw and a generally opposed moveable jaw, each having a jaw axis, said moveable jaw pivotally coupled to said static jaw at a joint, said jaws defining a conduit receiving space therebetween;

operating means for operating said compressing means, said operating means comprising an end of said static jaw remote from said conduit receiving space and an operating lever pivotally coupled to said static jaw adjacent one end of said lever, said operating means including link means for operably coupling said operating lever and said second jaw, said link means comprising a pair of curved links with generally opposed first and second link ends, one link on each side of said jaws, each link pivotally coupled to said second jaw at said first link end, and pivotally coupled to said operating lever at said second link end, wherein each link has a convex edge and a concave edge, the concave edge facing the working end and the convex edge facing the handle end of said clamp, said links being generally flat and parallel with respect to each other, each extending generally transversely relative to said static jaw; and adjustment means rotatably, operably coupled to said second jaw for selectively varying the size of said conduit receiving space.

14. An adjustable clamp for exerting a compressive force on conduits having relatively soft wall, said clamp having a working end and a handle end and comprising:

a static jaw and a generally opposed movable jaw, each having a jaw axis, said movable jaw coupled to said static jaw at a joint, said jaws defining a conduit receiving space therebetween;

an operating means for opening and closing said jaws relative to each other, said operating means movably coupled to said static jaw;

link means operably connecting said movable jaw and operating means; and adjustment means operably connected to said movable jaw for varying the size of said conduit receiving space when said jaws are in the closed position, said adjustment means comprising a generally cylindrical adjustment member having an eccentric outer surface, said member being rotatably, operably coupled to said movable jaw.

15. The clamp according to claim 14, wherein said adjustment member has a generally central axis of rotation, said axis of rotation being coaxial with said jaw axis.

16. An adjustable clamp having a working end and a handle end, said clamp for exerting a compressive force on relatively soft wall conduits and comprising:

a rigid, elongated static jaw having a butt end, a nose end and a neck, said neck located at a point generally midway between said butt end and nose end and being slightly angled whereby the longitudinal axis of said static jaw comprises two generally adjacent, parallel axes, one side of said static jaw having a rounded workpiece contacting surface including two side flanges extending from the nose end toward said neck, a generally elongated spine elevated outwardly from the static jaw opposite the side of said jaw having said workpiece contacting surface, said spine having an associated aperture at one end thereof, said neck having a recessed web generally coplanar with said spine, and a handgrip area adjacent said butt end;

a movable jaw, said movable jaw being relatively shorter than said static jaw and having a generally cylindrical portion and a generally rectangular portion, said cylindrical portion terminating at a free end and said rectangular portion terminating at a clevis end including a generally central slit defining inner opposing sides of two parallel shoulders;

a generally cylindrical hollow body rotatably coupled to said movable jaw for rotation about an axis, one end of said hollow body abutting said rectangular portion and an opposite end of said hollow body abutting a retaining means operably coupled to said cylindrical portion adjacent said free end, said hollow body having a plurality of arcuate, distinct, workpiece contacting surfaces, each said workpiece contacting surface of said hollow body being a different radial distance from said axis of rotation;

a rigid unitary lever member having a handle end and a generally polygonal, solid fulcrum end with planar parallel sides, said lever member pivotally coupled to said static jaw at said aperture associated with said spine at an over-the-center aperture in said fulcrum end, said lever extending outwardly toward said handle end from said fulcrum end generally diametrically from said fulcrum end, whereby said lever member and static jaw define acute angles throughout range of motion of said lever member, said fulcrum end further including an integral foot member extending outwardly from an outside corner of said fulcrum end portion whereby, when said boot contacts said static jaw, said handle and handgrip area are generally parallel, and a link pivot aperture adjacent an edge of said fulcrum end at a point generally diametrical from said foot member; and a link means for operably coupling said lever member and said movable jaw, said link means comprising a pair of curved links, each having first and second link ends, one link on each side of said jaws, each link pivotally coupled to said movable jaw at said first link end, and pivotally coupled to said link pivot aperture of said lever member at said second link end, each link having a convex edge and a concave edge, the concave edge facing said working end and the convex edge facing said handle end, said links being generally flat and parallel with respect to each other, each extending generally transversely relative to said static jaw.

17. The clamp according to claim 16, wherein said fulcrum end has a security hole adjacent the edge thereof at a point generally between said link pivot aperture and said over-the-center aperture, whereby a pin means may be received in said security hole when said jaws are in the closed position to preclude moving the jaws to an open position.

18. The clamp according to claim 17, wherein said cylindrical portion of said movable jaw has a generally radial detent drilling adjacent said free end, said detent drilling receiving a detent spring and ball, said hollow body having a detent hole associated with each said workpiece gripping surface of said hollow body, whereby said ball is releasably biased into one of said detent holes when said hollow body is rotated to a selected position, thereby releasably holding said hollow body in that position.

19. The clamp according to claim 18, wherein said static jaw includes a handgrip area adjacent said butt end.

* * * * *